(12) United States Patent
Dittel et al.

(10) Patent No.: US 12,282,722 B2
(45) Date of Patent: *Apr. 22, 2025

(54) SIMULATION OF UNIT OPERATIONS OF A CHEMICAL PLANT FOR ACID GAS REMOVAL

(71) Applicant: BASF SE, Ludwigshafen (DE)

(72) Inventors: Agnes Dittel, Ludwigshafen (DE); Ralf Notz, Ludwigshafen (DE); Sergey Vorobyev, Ludwigshafen (DE); Rainer Herget, Ludwigshafen (DE); Torsten Katz, Ludwigshafen (DE); Gerald Vorberg, Ludwigshafen (DE); Kim Hoeffken, Ludwigshafen (DE)

(73) Assignee: BASF SE ( * ) Notice: Subject to any disclaimer, the term of this patent is extended or adjusted under 35 U.S.C. 154(b) by 923 days.

This patent is subject to a terminal disclaimer.

(21) Appl. No.: 17/276,762

(22) PCT Filed: Sep. 16, 2019

(86) PCT No.: PCT/EP2019/074680
§ 371 (c)(1),
(2) Date: Mar. 16, 2021

(87) PCT Pub. No.: WO2020/058179
PCT Pub. Date: Mar. 26, 2020

(65) Prior Publication Data
US 2021/0271796 A1 Sep. 2, 2021

Related U.S. Application Data

(63) Continuation of application No. 16/135,465, filed on Sep. 19, 2018, now Pat. No. 11,048,842.

(30) Foreign Application Priority Data
Sep. 19, 2018 (EP) .................... 18195374

(51) Int. Cl.
G06F 30/331 (2020.01)
B01D 53/04 (2006.01)
(Continued)

(52) U.S. Cl.
CPC ....... *G06F 30/331* (2020.01); *B01D 53/0454* (2013.01); *B01D 53/1456* (2013.01);
(Continued)

(58) Field of Classification Search
CPC .................................................. G06F 30/331
See application file for complete search history.

(56) References Cited

U.S. PATENT DOCUMENTS 7,367,018 B2  4/2008  Noble et al.
8,650,013 B2  2/2014  Hanley
(Continued)

FOREIGN PATENT DOCUMENTS

EP  2821121      1/2015
JP  2006-277083 A  10/2006
(Continued)

OTHER PUBLICATIONS

International Search Report and Written Opinion for International Application No. PCT/EP2019/074680, 13 pages.
(Continued)

*Primary Examiner* — Nathan L Laughlin
(74) *Attorney, Agent, or Firm* — Faegre Drinker Biddle & Reath LLP

(57) ABSTRACT

The present invention is related to a method for determination of unit operations of a chemical plant for acid gas removal, the method carried out by a computer or a distributed computer system and the method comprising the steps of: providing (S1) a first set of parameters for the unit operations; providing (S2) a second set of parameters for the unit operations based on the provided first set of parameters
(Continued)

and based on data retrieved from a database; determining (S3) a digital model of the chemical plant based on the first set of parameters and the second set of parameters, wherein the digital model comprises a system of equations defining the unit operations of the chemical plant; selecting (S4) starting points for an equation-based solution method of the system of equations, wherein the starting points are at least partially selected from the: —i) the first set of parameters; —ii) the second set of parameters; and —iii) the data retrieved from the database; determining (S5) resultant settings for the unit operations of the chemical plant using the equation-based solution method for the system of equations initialized by the selected starting points.

13 Claims, 8 Drawing Sheets

(51) Int. Cl.
  B01D 53/14 (2006.01)
  G06F 17/11 (2006.01)
  H04L 43/0876 (2022.01)
  G06F 111/10 (2020.01)

(52) U.S. Cl.
  CPC .......... G06F 17/11 (2013.01); H04L 43/0876 (2013.01); G06F 2111/10 (2020.01)

(56) References Cited

U.S. PATENT DOCUMENTS

| | | | |
|---|---|---|---|
| 8,983,815 B2 | 3/2015 | Bleackley et al. | |
| 9,095,785 B2 | 8/2015 | Hanley | |
| 9,534,464 B1 | 1/2017 | Kelley et al. | |
| 11,446,603 B2* | 9/2022 | Amhamed | B01D 53/1425 |
| 2002/0013000 A1 | 1/2002 | Fagrell et al. | |
| 2003/0097243 A1 | 5/2003 | Mays et al. | |
| 2004/0070772 A1 | 1/2004 | Shchegrov | |
| 2006/0129372 A1* | 6/2006 | Gallarda | G05B 17/02 703/22 |
| 2007/0244575 A1 | 10/2007 | Wojsznis | |
| 2008/0125881 A1 | 5/2008 | Grott et al. | |
| 2011/0245937 A1 | 10/2011 | Rawson et al. | |
| 2011/0251700 A1 | 10/2011 | Hallihole et al. | |
| 2012/0029890 A1 | 2/2012 | Hanley | |
| 2012/0303300 A1 | 11/2012 | McDonald | |
| 2013/0144591 A1 | 6/2013 | Khan | |
| 2014/0228993 A1 | 8/2014 | Minnoy | |
| 2014/0330542 A1 | 11/2014 | Subramanian et al. | |
| 2015/0134317 A1 | 5/2015 | Maturana | |
| 2016/0018835 A1 | 1/2016 | Gaasch | |
| 2017/0064900 A1 | 3/2017 | Zemenchik | |
| 2017/0236067 A1 | 8/2017 | Tjiong | |
| 2018/0311609 A1 | 11/2018 | McCool | |
| 2020/0061523 A1* | 2/2020 | Cullinane | B01D 53/1425 |

FOREIGN PATENT DOCUMENTS

| | | |
|---|---|---|
| JP | 2012-194960 A | 10/2012 |
| JP | 2017-138919 A | 8/2017 |
| WO | 2011062710 | 5/2011 |
| WO | 2011133805 | 10/2011 |
| WO | 2014032113 | 3/2014 |
| WO | 2018146233 | 8/2018 |
| WO | 2018210738 | 11/2018 |

OTHER PUBLICATIONS

International Search Report and Written Opinion for International Application No. PCT/EP2019/074730, 10 pages.
Ying Zhang et al: "Modeling CO2 Absorption and Desorption by Aqueous Monoethanolamine Solution with Aspen Rate-based Model", Energy Procedia, vol. 37, Jan. 1, 2013 (Jan. 1, 2013), pp. 1584-1596, XP055573484, NL ISSN: 1876-6102, DOI: 10.1016/j.egypro.2013.06.034.
Akira Kishimoto et al: "Exergy recuperative CO2 gas separation in precombustion capture", Clean Technologies and Environmental Policy, Jun. 1, 2012 (Jun. 1, 2012), pp. 465-474, XP055573475, Berlin/Heidelberg DOI: 10.1007/s10098-011-0428-3, Retrieved from the Internet: URL:https://www.aidic.it/cet/11 /25/002.pdf, 13 pages.
Monica Garcia et al: "ASPEN PLUS simulation model for CO2 removal with MEA: Validation of desorption model with experimental data", Journal of Environmental Chemical Engineering, vol. 5, No. 5, Oct. 1, 2017 (Oct. 1, 2017), pp. 4693-4701, XP055573483, ISSN: 2213-3437, DOI: 10.1016/j.jece.2017.08.024, 10 pages.
Goedecke, Ralf, "Fluidverfahrenstechnik: Grundlagen, Methodik, Technik, Praxis", 2011, Wiley-VCH Verlag GmbH, Germany, 4 pages.
European Search Report for EP Patent Application No. 18195373.8, Issued on Apr. 12, 2019, 4 pages.
Adib, H., Sharifi, F., Mehranbod, N., Kazerooni, N. M., & Koolivand, M. (2013). Support Vector Machine based modeling of an industrial natural gas sweetening plant. Journal of Natural Gas Science and Engineering, 14, 121-131. (Year: 2013), 11 pages.
Kale, Chinmay, Andrzej Górak, and Hartmut Schoenmakers. "Modelling of the reactive absorption of CO2 using mono-ethanolamine." International Journal of Greenhouse Gas Control 17 (2013): 294-308. (Year: 2013), 15 pages.
Mores, P., Rodriguez, N., Scenna, N., & Mussati, S. (2012). CO2 capture in power plants: Minimization of the investment and operating cost of the post-combustion process using M EA aqueous solution. International Journal of Greenhouse Gas Control, 10, 148-163. (Year: 2012), 16 pages.
Selvan, K. K., & Panda, R. C. (2018). Mathematical Modeling, Parametric Estimation, and Operational Control for Natural Gas Sweetening Processes. ChemBioEng Reviews, 5(1), 57-74. (Year: 2018), 18 pages.

* cited by examiner

SIMULATION OF UNIT OPERATIONS OF A CHEMICAL PLANT FOR ACID GAS REMOVAL

CROSS-REFERENCE TO RELATED APPLICATIONS

This application is a national stage entry under 35 U.S.C. § 371 of International Application No. PCT/EP2019/074680, filed on Sep. 16, 2019, which claims the benefit of priority of U.S. Non-Provisional patent application Ser. No. 16/135,465, filed on Sep. 19, 2018, and European Patent Application No. 18195374.6, filed on Sep. 19, 2018, the disclosures of which are hereby incorporated by reference herein in their entireties.

FIELD OF THE INVENTION

The present invention is related to a method for determination of unit operations of a chemical plant for acid gas removal is provided, a corresponding system and a corresponding computer program product.

BACKGROUND OF THE INVENTION

Simulation of chemical processing is commonly used in chemical and process engineering to simulate and determine the general flow of products of plant processes and equipment in chemical plants.

US 20120029890 A1 describes methods of designing or optimizing a column for a separation process that includes the computer implemented steps of, in a digital processor, providing vapor-side and liquid-side mass transfer coefficient expressions and a mass transfer area expression relevant for a subject column, the vapor-side and liquid-side mass transfer coefficient expressions and the mass transfer area expression having been derived from defining a column average height equivalent to a theoretical plate as a mathematical relationship. The expressions are further derived from reducing error of curve fitting empirical data of various columns. The method also includes using the provided expressions to determine column height and column width configurations of the subject column, and outputting the determined column height and column width configurations of the subject column.

EP 2 534 592 A2 describes methods and systems including an input module enabling user specification of a subject facility design based on limited data. The subject facility design includes design alternatives, and a processor routine coupled to the input module and responsive to the user specification by forming an input data set to a rigorous simulation modeller to model the subject facility design. The rigorous simulation modeller requires input beyond the limited data.

U.S. Pat. No. 7,367,018 B2 describes methods and apparatuses for managing process and plant engineering data for chemical or other engineering processes across applications. The method and apparatus include a respective class view for each of multiple software applications, a composite class view, a conceptual data model and a resulting consolidated multi-tier data model. The multi-tier data model enables sharing of engineering and other data from the multiple software applications with other process and plant engineering applications and programs.

Accordingly, it is an object of the present invention to provide improved designing of unit operations of a chemical plant for acid gas removal.

SUMMARY OF THE INVENTION

The foregoing and other objects are solved by the subject-matter of the present invention.

According to a first aspect of the present invention, a method for determination of unit operations of a chemical plant for acid gas removal is provided, in particular, the method is a computer-implemented method, wherein the method is carried out by a computer or a distributed computer system and wherein the method comprises the steps of: providing or receiving, by a processing device, a first set of parameters for the unit operations; providing or identifying, by the processing device, a second set of parameters for the unit operations based on the provided or received first set of parameters and based on data retrieved from a database; determining or generating, by the processing device, a digital model of the chemical plant based on the first set of parameters and the second set of parameters, wherein the digital model comprises a system of equations defining the unit operations of the chemical plant; selecting, by the processing device, starting points for an equation-based solution method of the system of equations, wherein the starting points are at least partially selected from: —i) the first set of parameters; —ii) the second set of parameters; and —iii) the data retrieved from the database; determining, by the processing device, resultant settings for the unit operations of the chemical plant using the equation-based solution method for the system of equations initialized by the selected starting points.

The determination of unit operations of a chemical plant for acid gas removal includes for instance determining operating and/or dimensioning parameters of a chemical plant or of a gas treatment plant for treating a gaseous inlet stream with a treatment solution to provide a treated outlet stream, preferably an acid gas removal plant for removing one or more acid gas component(s) from a gaseous inlet stream with a treatment solution to provide a treated outlet stream, including one or more gas treatment units.

The present invention provides determination of unit operations of one or more gas treatment units for a chemical plant by treating a process flowsheet as a set of equations to be solved simultaneously. Certain embodiments of the present invention provide a database as a basis for an improved selecting of starting profiles by identifying previously successfully used starting profiles of previously solved simulations and provided solutions. The database is thereby advantageously separated from the user interaction. Certain embodiments of the present invention advantageously provide powerful and determination of convergence criteria to solve the system of equations and powerful custom modeling based on user input. Certain embodiments of the present invention further advantageously provide online, on-field, real-time determination of convergence criteria to solve the system of equations for designing of chemical plants. Certain embodiments of the present invention further advantageously provide a graphical user interface that reduces the amount of information presented to a user, thus improving upon the usability of the graphical user interface by allowing the user to more efficiently specify input parameters.

In other words, the method for determination of unit operations of a chemical plant for acid gas removal may include the following steps:

Input parameters may be provided by a user and may be sent by a client device to the simulation server, e.g. the determination server.

The input parameters may be used by the determination server to set up the system of equations.

The system of equations may be represented by MESH, abbreviated for Material balances, Equilibrium relations, Summation equations, Heat balances, or by the MERSHQ equations abbreviated for Material balances, Energy balances, mass and heat-transfer Rate equations, Summation equations, Hydraulic equations for pressure drop, eQuilibrium equations. Additionally the input parameters may be stored in a volatile or non-volatile storage medium by a database server to remain accessible for later starting profile generation in terms of starting profiles which correspond to starting points plus metadata.

With the simulation run by the determination server based on the input parameters provided by the user, the system of equations is solved by reaching convergence criteria and the final solution includes all variables, which were to be determined for the system of equations.

To generate a starting profile, the final solution determined by the determination server with all determined variables may be stored as starting point (i.e. all variables) by means of the database server. In addition the metadata including the input parameters are stored by the database server and associated with the corresponding starting points of that particular same simulation run.

According to one embodiment of the present invention, the first set of parameters for the unit operations comprises at least one relative parameter.

According to one embodiment of the present invention, the second set of parameters for the unit operations comprises at least one relative parameter.

According to one embodiment of the present invention, the data comprises at least one relative parameter.

The term "relative parameter" as defined by the present invention may be understood as a ratio of least two corresponding parameters dependent on (i) any throughput—a mass throughput or a volume throughput—of the chemical plant or dependent on (ii) any geometry or dimension or measurement—for instance of any gas treatment unit of the chemical plant.

The term "input parameter" as defined by the present invention may be understood as any parameter to be provided by a user simulating or designing a chemical plant.

The term "resultant settings" as defined by the present invention may be understood as any set of data of variables and constants for a given set of equations to be solved simultaneously for providing a design modeling of the chemical plant by determining convergence criteria to solve the system of equations.

The term "starting profiles" as defined by the present invention may be understood as a data structure comprising starting points and any further metadata.

The present invention advantageously enables an optimized modeling and subsequently generated design of gas treatment plants, preferably acid gas removal plants based on modelled and determined parameters.

For example relative parameters are introduced, which enables a simpler design process, since the relative parameters are problem or functionally driven, whereas corresponding parameters require the user to translate the problem or functionally driven specification of the gas treatment plant into a specific structural or operational parameter. Moreover, the design constraints are easier to foresee in terms of the relative, e.g. functionally driven, parameters than in terms of any structural, dimensional or operational parameters. As such the ability to produce physically meaningful results is greatly enhanced. In particular no expert knowledge is required to perform determinations of the operating and/or dimensioning parameters for gas treatment plants, since no expert knowledge is required to specify.

Additionally, by introducing relative parameters any correlations of input parameters are reduced or led back allowing for more robust and stable determination of the dimensioning and/or operating parameters, which are implemented in a gas treatment plant to be physically built. Thus the complexity of the design process is reduced in view of the number of iterations required to find physically and chemically meaningful operating and/or dimensioning parameters. Hence the computer program, when loaded into a processing system and executed, transforms the system overall from a general-purpose computing system into a special-purpose computing system customized to an environment for simplified and more efficient gas treatment plant design.

The relative parameter as used herein relates for instance to a corresponding parameter. The relative parameter is as such independent of the plant throughput and the corresponding parameter as such depends on the plant throughput or depends on the gas treatment unit geometry. In a particular example, the relative parameter may be independent of a plant scale, physical dimensions of the gas treatment plant, a gas treatment unit geometry and/or a capacity of the gas treatment plant. Relative parameters may be functional parameters, which in contrast to the corresponding parameters are not directly correlated to the plant throughput, the plant scale, the physical dimensions of the gas treatment plant, the gas treatment unit geometry and/or the capacity of the gas treatment plant. One example is the hydraulic load in the absorber as relative parameter. This parameter is a functional parameter in specifying a criterion as distance to hydraulic flooding rather than the absorber diameter. In contrast the corresponding parameter, in this example the absorber diameter, is directly correlated to the plant throughput, the plant scale and/or the capacity of the gas treatment plant. Whereas the specification of an unsuitable absorber diameter could lead to flooding conditions and unstable or physically not meaningful operating conditions, the specification of a hydraulic load, e.g. via a safety factor less than 1 and greater than 0.5, inherently avoids design of unstable or unreasonable conditions.

According to one embodiment of the present invention, the method further comprises the step of storing, by the processing device, the selected starting points and the determined resultant settings for the unit operations of the chemical plant in the database.

According to another embodiment of the present invention, the step of selecting the starting points for the equation-based solution method of the system of equations comprises selecting at least partially starting points of a previously performed equation-based solution method of the system of equations as stored in the database.

According to a further embodiment of the present invention, the step of selecting at least partially the starting points of the previously performed equation-based solution method of the system of equations as stored in the database comprises comparing the determined and stored resultant settings of the previously performed equation-based solution method with desired settings of the current method for determination, wherein optionally the first set of parameters for the unit operations comprise the desired settings.

According to one embodiment of the present invention, the first set of parameters for the unit operations is provided or received by a client device; and/or wherein the second set of parameters for the unit operations is provided or identified by a determination server; and/or wherein the data is provided by a database server.

According to another embodiment of the present invention, the step of providing or identifying the second set of parameters for the unit operations based on the first set of parameters comprises:
  i) providing or identifying at least one parameter, which was not specified by the first set of parameters; and/or
  ii) providing or identifying at least one parameter, which is a complementary parameter to the first set of parameters.

According to still another embodiment of the present invention, the providing or identifying of the second set of parameters for the unit operations based on the first set of parameters comprises determining unspecified or complementary parameters with regard to the first set of parameters using chemical parameters as specified by the data retrieved from the database.

According to still another embodiment of the present invention, the metadata may be complemented to include more than the input parameters. Such additional metadata may for instance include:
  i) in case the user specified the strip steam ratio in the input
  parameters as relative parameter, the simulation determined the corresponding of the reboiler duty, hence the determined reboiler duty can be stored as additional metadata; this way the starting profile may be found, if in another simulation run the user provides the reboiler duty rather than the strip steam ratio.
  ii) This is applicable for all relative parameters provided as input
  parameters and the resulting corresponding parameters and vice versa. In fact the completion of metadata even goes as far as explicitly determining the relative parameters, even if the corresponding parameter was provided as input parameter.

According to still another embodiment of the present invention, in searching the starting profiles, the first step is to filter potentially applicable starting profiles. Such filter may by very coarse in only taking a sub set of input parameters into account (e.g. the solvent, the configuration or structural parameters). According to still another embodiment of the present invention, in a second step such potentially applicable starting profiles are ranked based on the full set input parameters. This allows for more efficient selection and access. Further filters and rankings may be applied. The core here is to reduce the processing complexity and burden.

Hence metadata is any data that is associated with the starting points and enables selection of specific starting profiles as an advantage of the present invention. As input parameters for instance configuration parameters are provided. Such configuration parameters may further specify a column type such as packed bed or tray column, a number of segments in the column, pressure conditions like the pressure drop over the column, temperature conditions or a distributor type for the liquid treatment solution.

According to still another embodiment of the present invention, the configuration parameters may specify the gas treatment and/or process units included in the gas treatment plant and their interconnection representing streams. Further, the configuration parameters may be fully or partly pre-defined providing a fixed set of possible configurations.

Such pre-defined configurations may be stored in a database and can be identified in the process specific input parameters via one or more identifier(s) signifying the respective configuration parameters. Pre-defined configuration parameters guide the user by reducing the problem space and lead to a more robust and stable determination of operating and/or dimensioning parameters. In embodiments where the configurations are not fully pre-defined the method can include a validation step to ensure sensible configurations are defined by the user.

According to still another embodiment of the present invention, the type of metadata may for instance be descriptive, e.g. defining the configuration or the industry application-type as for example ammonia, LNG, natural gas application, solvent or absorption medium, main configuration of the process, for instance how many absorbers, HP Flash, heat exchanger.

Structural metadata could also be seen in the sense of the latter, since configuration includes plant structure like the plant flow chart and the treatment units as for example absorber internals or the like.

According to a second aspect of the present invention, a system for determination of unit operations of a chemical plant preferably for acid gas removal is provided, preferably comprising a determination server communicatively coupled to a client device and a database server comprising a database, the system comprising:
  i) a client device, which is configured to provide or receive a first set of parameters for the unit operations;
  ii) a database server comprising a database configured to provide or identify data;
  iii) a determination server, which is configured to provide or identify a second set of parameters for the unit operations based on the provided first set of parameters and based on the data from a database or retrieved from the database server, wherein the determination server is further configured to determining or generating a digital model of the chemical plant based on the first set of parameters and the second set of parameters, wherein the digital model comprises a system of equations defining the unit operations of the chemical plant;
wherein the determination server is further configured to select starting points for an equation-based solution method of the system of equations, wherein the starting points are at least partially selected from:
  i) the first set of parameters;
  ii) the second set of parameters; and
  iii) the data retrieved from the database;
wherein the determination server is further configured to determine resultant settings for the unit operations of the chemical plant using the equation-based solution method for the system of equations initialized by the selected starting points.

According to one embodiment of the second aspect, a system for determining unit operations of a chemical plant preferably for acid gas removal is provided, the system comprising:
  a determination server communicatively coupled to a client device and a database server comprising a database, wherein the determination server is configured to:
    provide or receive a first set of parameters for the unit operations;
    provide or identify a second set of parameters for the unit operations based on the first set of parameters and based on data retrieved from the database server;
    determine or generate a digital model of the chemical plant based on the first set of parameters and the second set of parameters, wherein the digital model comprises a system of equations defining the unit operations of the chemical plant;
    select starting points for an equation-based solution method of the system of equations, wherein the starting points are at least partially selected from:

i) the first set of parameters;
ii) the second set of parameters; and
iii) the data retrieved from the database; and
determine resultant settings for the unit operations of the chemical plant using the equation-based solution method for the system of equations initialized by the selected starting points.

According to a further embodiment of the present invention, the system is further configured to store the selected starting points and the determined resultant settings for the unit operations of the chemical plant in the database of the database server.

According to a further embodiment of the present invention, the determination server is further configured to select the starting points for the equation-based solution method of the system of equations by selecting at least partially starting points of a previously performed equation-based solution method of the system of equations as stored in the database.

According to a further embodiment of the present invention, the determination server is further configured to at least partially select the starting points of the previously performed equation-based solution method of the system of equations as stored in the database by comparing the determined and stored resultant settings of the previously performed equation-based solution method with desired settings of the current method for determination, wherein optionally the first set of parameters for the unit operations comprise the desired settings.

According to a further embodiment of the present invention, the determination server is further configured to provide or identify the second set of parameters for the unit operations based on the first set of parameters by:
i) providing or identifying at least one parameter, which was not specified by the first set of parameters; and/or
ii) providing or identifying at least one parameter, which is a complementary parameter to the first set of parameters.

According to a further embodiment of the present invention, the determination server is further configured to provide or identify the second set of parameters for the unit operations based on the first set of parameters by determining unspecified or complementary parameters with regard to the first set of parameters using chemical parameters as specified by the data.

In one embodiment, a method may include designing and assembling a chemical plant based on the operating and/or dimensioning parameters determined by one or more of the methods described herein. In another embodiment, a method may include producing a chemical product using the chemical plant.

It is to be understood that the embodiments described herein are not mutually exclusive of each other, and that one or more of the described embodiments may be combined in various ways, as would be appreciated by one of ordinary skill in the art.

The methods for determining unit operations may be used in training operating personnel or in a rigorous model based advanced process control. In case of training the methods may be connected to an operation stand and from any input by the personnel to the operation stand process specific input parameters may be generated. Based on such generated input parameters operating and/or dimensioning parameters may be determined and a feedback may be given to the operator. In case of rigorous model based advanced process control the software is run in rating mode. Based on process specific input parameters operating parameters may be determined and compared to measured operating parameters in real time. In a preferred embodiment, operating parameters may be determined in the rating mode based on input parameters derived from the analysis of the concentration of one or more components in one or more process streams, preferably the content of amines and/or water in the absorption medium or the concentration of one or more acid gases in the treated gas stream or feed gas stream. Input parameters relating to the concentration of one or more components in a process stream may be determined by methods known in the art, such as spectral methods or chromatographic methods. In a particularly preferred embodiment, the operating parameters determined in the rating mode and which are based on input parameters relating to the concentration of one or more components in the treated outlet stream are the solution flow rate of the absorption medium and the reboiler duty of the regenerator. Since the concentration of one or more components of a process stream may change with increasing operation time, the aforementioned preferred embodiment enables the determination of optimized operating parameters, such as the reboiler duty or the solution flow rate, based on the actual concentration of components in the gas treatment plant.

According to a third aspect of the present invention, a computer program product is provided comprising computer-readable instructions which, when loaded and executed on processor, perform the method according to any one of the embodiments of the first aspect or the first aspect as such.

A computer program performing the method of the present invention may be stored on a computer-readable medium. A computer-readable medium may be a floppy disk, a hard disk, a CD, a DVD, an USB (Universal Serial Bus) storage device, a RAM (Random Access Memory), a ROM (Read Only Memory) and an EPROM (Erasable Programmable Read Only Memory).

A computer-readable medium may also be a data communication network, for example the Internet, which allows downloading a program code.

A computer program performing any of the methods of the present invention may be stored on a computer-readable storage medium (e.g., a non-transitory computer-readable storage medium). A computer-readable storage medium may be a floppy disk, a hard disk, a CD (Compact Disk), a DVD (Digital Versatile Disk), a USB (Universal Serial Bus) storage device, a RAM (Random Access Memory), a ROM (Read Only Memory), an EPROM (Erasable Programmable Read Only Memory), or other suitable device. The present invention can be implemented in digital electronic circuitry, or in computer hardware, firmware, software, or in combinations thereof, e.g. in available hardware of conventional mobile devices or in new hardware dedicated for processing the methods described herein, as will be described in greater detail below.

In a further embodiment the methods described herein may be used in a rigorous model based advanced process control, that may be run in existing gas treatment plants to monitor or control processes.

BRIEF DESCRIPTION OF THE DRAWINGS

A more complete appreciation of the invention and the attendant advantages thereof will be more clearly understood by reference to the following schematic drawings, which are not to scale, wherein.

DETAILED DESCRIPTION OF EMBODIMENTS

Figure 1:
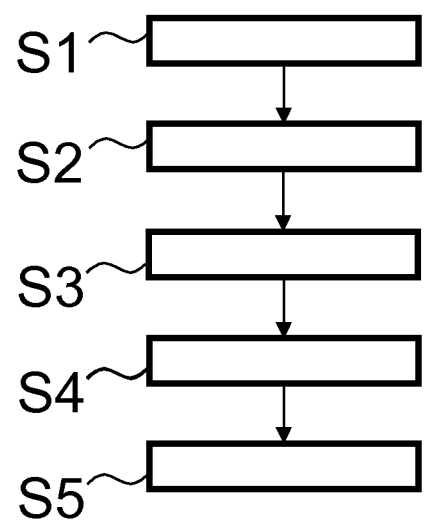
FIG. 1 shows a schematic flowchart diagram of a method for determination of unit operations of a chemical plant for acid gas removal according to an exemplary embodiment of the invention.

The illustration in the drawings is schematically and not to scale. In different drawings, similar or identical elements are provided with the same reference numerals.

Generally, identical parts, units, entities or steps are provided with the same reference symbols in the figures.

FIG. 1 shows a schematic flowchart diagram of a method 10 for determination of unit operations of a chemical plant for acid gas removal according to an exemplary embodiment of the invention.

The method for determination of unit operations of a chemical plant may comprise at least the following steps:

As a first step of the method, providing S1 a first set of parameters for the unit operations is conducted. According to a further embodiment of the present invention, the first set of parameters for the unit operations may include parameters as required by the user of the chemical plant, for instance a quantity of gas to be treated by amine gas treating, using aqueous solutions of alkylethanolamines to remove hydrogen sulfide and carbon dioxide from gases. This results in a carbon dioxide- and/or hydrogen sulfide-depleted outlet gas.

According to one embodiment of the present invention, the first set of parameters for the unit operations comprises at least one relative parameter.

According to a further embodiment of the present invention, the user may further specify with the first set of parameters geometrical dimensions of units of the chemical plant, e.g. height, width or length or volume any one of the absorber unit and the regenerator unit and further accessory equipment.

Further parameters as defined with the first set of parameters may be for instance values of required gas flow values or maximum concentration values of the overhead gas produced from the regenerator, e.g. the concentration of extracted hydrogen sulfide and carbon dioxide.

As a second step S2 of the method 10, providing a second set of parameters for the unit operations based on the provided first set of parameters and based on data retrieved from a database is conducted.

According to one embodiment of the present invention, the second set of parameters for the unit operations comprises at least one relative parameter.

According to a further embodiment of the present invention, the data retrieved from a database may comprise chemical and physical properties of the involved gases, materials or geometrical properties of process piping and equipment items of the chemical plant. The second set of parameters may for instance be provided to complete the first set of data to arrive at full set of data covering required parameters for a simulation.

According to one embodiment of the present invention, the data retrieved comprises at least one relative parameter.

In one embodiment wherein one of the one or more gas treatment units is an absorber, particularly for treating a gaseous inlet stream with a treatment solution to provide a treated outlet stream, wherein absorber input parameters are provided including at least one of the following relative parameters:

i. a ratio specifying a fraction of one or more depleted component(s) in the treated outlet stream with regard to the whole outlet stream;

ii. a loading factor indicating any distance to the equilibrium capture capacity of the treatment solution in the absorber; and iii. an acceptable hydraulic load indicative of the distance to flooding condition.

In one example the absorber input parameters may include available relative parameters out of the above listened i, ii and iii.

In another example the absorber input parameters include two out of the above listened parameters and any remaining absorber input parameter is specified via the corresponding dependent parameter.

In yet another example the absorber input parameters include one of the available relative parameters and the remaining absorber input parameters are specified via the corresponding parameters.

In one example the absorber input parameters include at least one of the absorber height, the absorber diameter or the solution flow rate as relative parameter by providing:

for the absorber height, a composition in the treated outlet stream, for the flow rate, a loading factor of the treatment solution in the absorber, for the absorber diameter, an acceptable hydraulic load for the absorber.

Following this rational, the absorber height, the flow rate and the absorber diameter are corresponding parameters respectively and as such part of the operating and/or dimensioning parameters, which will be determined based on the digital model.

Based on the above parameters the concept of providing relative parameters is more apparent. For instance, the composition in the treated outlet stream is relative and in this specific case may be dimensionless in the sense that it may be determined by the ratio of the amount of any component to be absorbed residing in the treated outlet stream to the sum of the amount of all components in the treated outlet stream.

According to a further embodiment of the present invention, this ratio relates to the absorber height, since the amount of any component to be absorbed changes as the path through the absorber increases. Similarly, the loading factor is relative and in this specific case may be dimensionless in the sense that it may be determined by the ratio of actual loading to equilibrium loading.

According to a further embodiment of the present invention, this ratio relates to the treatment solution flow rate, since the actual loading decreases as the treatment solution flow rate or flow rate increases. The hydraulic load is relative and in this specific case may be dimensionless in the sense that it may be determined by the ratio of the actual hydraulic load to the hydraulic load at flooding limit.

According to a further embodiment of the present invention, this ratio relates to the absorber diameter, since the actual hydraulic load decreases as the diameter of the absorber increases. Hence relative parameters in the sense of the present invention for instance may relate to functionally driven parameters, which are preferably based on ratios or similar relations of corresponding parameters. Such relative parameters are independent or not directly correlated to the plant throughput, the plant scale, the physical dimensions of the plant and/or the capacity of the gas treatment plant.

In providing relative parameters for the absorber, no specification of the absorber height, the absorber diameter or the flow rate is required. Instead the composition in the treated outlet stream, the acceptable hydraulic load or the loading factor of the treatment solution in the absorber are provided. The composition in the treated outlet stream may be determined by the ratio of the amount of any component to be absorbed residing in the treated outlet stream to the sum of the amount of all components in the treated outlet stream.

The composition specifying a proportion of one or more depleted gas component(s) in the treated outlet stream may be based on individual proportion(s) for each depleted gas component(s). The composition may also be based on a sum or partial sum of proportions of depleted gas components.

According to a further embodiment of the present invention, the second set of parameters may for instance define ionic components of multi-component gas streams. The ionic components may be calculated and determined depending on temperature profiles, wherein also the temperature profiles may be provided by the database based on required temperatures in the single operating units of the chemical plants or in single equipment items.

As a third step S3 of the method 10, determining a digital model of the chemical plant based on the first set of parameters and the second set of parameters is conducted, wherein the digital model comprises a system of equations defining the unit operations of the chemical plant is conducted.

As a fourth step S4 of the method 10, selecting starting points for an equation-based solution method of the system of equations is conducted, wherein the starting points are at least partially selected from:
i) the first set of parameters;
ii) the second set of parameters; and
iii) the data retrieved from the database.

According to a further embodiment of the present invention, the equation-based solution may for instance be conducted by an equation-oriented approach, where the process flow of the chemical plant is treated as a set of equations to be solved simultaneously.

According to a further embodiment of the present invention, the selecting of starting profiles for an equation-based solution may comprise determining the starting points based on the input parameters, which are the closest to the metadata associated with the starting points. as provided by the database server. According to a further embodiment of the present invention, the starting profiles may include previously used and/or calculated starting points, and also calculated or used parameters of the previously determined solutions and output data and metadata.

In other words, the starting profiles may be used to complete and provide complementary data with respect to the first set of parameters, thus the user does not have to provide certain parameters in detail and such parameters are filled out based on starting points stored in starting profiles of the data base and the data is round off by the starting profiles of the database.

As a fifth step S5 of the method 10, determining resultant settings for the unit operations of the chemical plant using the equation-based solution method for the system of equations initialized by the selected starting points is conducted.

In a further embodiment the method for determination of unit operations of a chemical plant for acid gas removal according to an exemplary embodiment of the invention, the data retrieved from the database comprises thermodynamic parameters, wherein the thermodynamic parameters are derived from measurements of thermodynamic properties of gas treatment plants under operating or lab conditions. The thermodynamic parameters are preferably indicative of thermodynamic properties in gas treatment plants under operating conditions.

A further embodiment providing thermodynamic parameters indicative of thermodynamic properties in gas treatment plants under operating conditions may include the data retrieved from the database. Such retrieved data complements the input parameters and thus reduces the number of parameters that must be provided by a user.

Preferably, the thermodynamic parameters are based on historical measurement data of operating gas treatment plants or lab scale experiments to provide a more accurate basis for the determination of the operating and/or dimensioning parameters. The thermodynamic parameters may comprise thermodynamic solvent-gas parameters specifying equilibrium conditions, kinetic parameters such as reaction rate or mass transfer parameters relating to density, viscosity, surface tension, diffusion coefficients or mass transfer correlations. Specifically including kinetic parameters enhances the accuracy of the determined resultant settings, since not only the equilibrium conditions are accounted for.

In a preferred embodiment, in case a relative parameter is used, the relative parameter may be restricted to be within a pre-defined range. Here one or more of the above absorber input parameters or regenerator input parameters specified as relative parameters may lie within a predefined range.

In a further embodiment a consistency check is performed for the at least one relative parameter before and/or after determining S3 the digital model of the chemical plant, wherein the at least one relative parameter is consistent, if it lies within a pre-defined range. Such consistency check may be implemented via a permission object before receipt of the request and/or as separate check after receipt of the request. In particular the initialization of the digital model may be performed, if the relative parameter is determined to be consistent. If the relative parameter is determined not to be consistent a warning is provided via the output interface.

In a further embodiment the physical performance of the gas treatment plant is described by the process specific input parameters including the gas treatment unit input parameters and thermodynamic parameters, and the determination of unit operations in connection with the digital model. Here the digital model may include a system of equations defining unit operations in the form of the one or more gas treatment unit(s) or process unit(s) of the gas treatment plant.

The digital model may include any gas treatment unit or process unit specified via the configuration parameters. For instance, the digital model may include an absorber and/or a regenerator model characterizing the mass and heat transfer in the absorber and/or regenerator, respectively. The digital model is hence a vehicle to reliably and accurately describe the gas treatment plant and such description is used to make reliable and accurate predictions on the dimensioning and/or operating parameters to be implemented in the physical gas treatment plant to be built.

The digital model may be based on MESH equations, Material balances, Equilibrium relations, Summation equations, Heat balances, or may be based on MERSHQ equations, Material balances, Energy balances, mass and heat-transfer Rate equations, Summation equations, Hydraulic equations for pressure drop, eQuilibrium equations, and optionally cost equations for example operational and/or capital expenditures may be included, as known in the art (e.g. Ralf Goedecke; Fluidverfahrenstechnik, Grundlagen, Methodik, Technik, Praxis; 2011; WI LEY-VCH Verlag GmbH & Co., Weinheim, Germany; ISBN: 978-3-527-33270-0).

In a further embodiment the determination of unit operations may include determining the dimensioning and/or operating parameters of the units.

In a further embodiment the determination of unit operations may include using an equation-based solution method or a sequential-modular solution method for the digital model. In sequential-modular solution methods unit operations are solved in sequence, starting with the inlet stream and sequentially solving downstream unit operations such as the absorber unit operation or the regenerator unit operation.

Such built in directionality from inlets to outlets make downstream specifications, e.g. composition of the outlet stream, difficult. This can be overcome by introducing control loops, which control the downstream specifications, e.g. composition of the outlet stream. Such a control loop determines stepwise the difference to a control parameter, such as the composition of the outlet stream, which adds to the complexity and slows down the processor.

In equation-based solution methods the unit operations are treated as a set of equations. Preferably, the equation-based solution method includes all equations of the digital model in a single system of equations, which are solved simultaneously. The system of equations may be solved numerically by simultaneously fulfilling all equations with a defined accuracy. Finding the solution for the system of equations may include more than one iteration.

The use of an equation-based solution method enables a simple specification of relative parameters, which is simpler than in sequential-modular solution methods. Moreover, in an equation-based solution method it is important to specify meaningful starting or initial input parameters such that the method finds a solution. The specification of relative parameters for the gas treatment unit input parameters provides an improved and enhanced way to provide meaningful starting or initial input parameters.

Providing at least one of the above relative parameters in the gas treatment unit input parameters may affect the digital model in that the digital model may include the relation for the relative parameter to the corresponding parameter. For the absorber input parameters this may include one or more relations of a desired fraction level of the at least one of the composition in the treated outlet stream to the absorber height, or for instance the loading factor of the treatment solution in the absorber to the flow rate or the acceptable hydraulic load to the absorber diameter, respectively.

Similarly, the relations for the regenerator input parameters may be included. Determining the dimensioning and/or operating parameters may include determining convergence criteria for the gas treatment units of the gas treatment plant using an equation-based solution method for the digital model, wherein the convergence criteria relate to physical system balances. Examples for such balances are those provided by the MESH equations, Material balances, Equilibrium relations, Summation equations, Heat balances, or by the MERSHQ equations, Material balances, Energy balances, mass and heat-transfer Rate equations, Summation equations, Hydraulic equations for pressure drop, eQuilibrium equations, and optionally cost equations for e.g. operational and/or capital expenditures.

Here convergence may refer to iteratively determining dimensioning and/or operating parameters until convergence criteria are reached in the sense that a threshold value for the physical system balances is reached.

Furthermore providing at least one of the above relative parameters may affect the output in that the output of the operating and/or dimensioning parameters includes the corresponding parameter of the gas treatment unit related to the relative parameter provided as gas treatment unit input parameter. Depending on the relative parameter the operating and/or dimensioning parameters include e.g. the height of the absorber as dimensioning parameter, the diameter of the absorber as dimensioning or the solution flow rate in the absorber under operating conditions as operating parameter.

Furthermore, the output of the operating and/or dimensioning parameters includes depending on the relative parameter at least one of the reboiler duty as operating parameter or the regenerator diameter as dimensioning parameter.

According to a further embodiment of the present invention, the client device may be part of a client-side arranged computer environment and the database server and the determination server may be part of a server-side computer environment.

The client device may be implemented as a web service or a standalone software package, e.g. an application software. In a further embodiment the database server and the determination server may be part of the client-side of the distributed client-server computer system.

On the client device side, the process specific input parameters and particularly gas treatment unit input parameters may be provided by specifying a required purity grade or composition of the treated outlet stream, e.g. one or more fractions of compounds of the treated outlet stream may be defined by certain values for a given fraction.

In a sales gas application for instance purity grades of less than or equal to 2-4 mol % gas may be much lower than in other liquified natural gas (LNG) applications with high purity grade requirements of less than or equal to 50 mol ppm gas.

A minimal set of process specific input parameters may be inlet gas conditions, such as temperature, composition or pressure, pressure conditions in the gas treatment units, condensation temperature at the regenerator top and lean solution temperature. To meet such diverse technical needs, the gas treatment plant type can be utilized to restrict process specific input parameters on the input module level in such a way that the determination of dimensioning and/or operating parameters or the determination of operating parameters to operate an existing gas treatment plant is performed in a controlled and more efficient way.

Defining which gas treatment unit input parameters are provided as relative parameter or as corresponding parameter, may include for each gas treatment input parameter a permission object allowing to provide a single gas treatment input parameter to be either specified as relative parameter or corresponding parameter. This may be implemented by providing on the user interface of the input module a selection option. Alternatively, the permission object may allow to provide a single gas treatment input parameter to be exclusively specified as relative parameter or as corresponding parameter.

Similarly defining which process specific input parameters are provided based on a plant type, may include for each gas treatment input parameter a permission to provide only certain process specific input parameters, wherein others are fixed. Alternatively or additionally defining which process specific input parameters are provided based on a plant type, may include for each gas treatment input parameter a permission to provide only process specific input parameters in a specified range.

Figure 2:
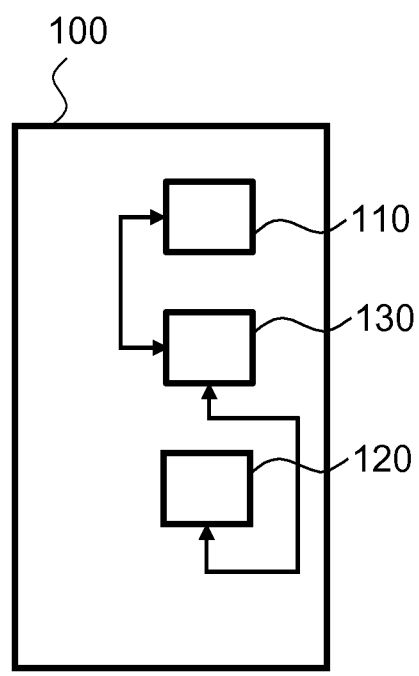
FIG. 2 shows a schematic diagram of a system for determination of unit operations of a chemical plant for acid gas removal according to an exemplary embodiment of the invention.

FIG. 2 shows a schematic diagram of a system 100 for determination of unit operations of a chemical plant for acid gas removal according to an exemplary embodiment of the invention.

The system 100 for determination of unit operations of a chemical plant for acid gas removal may comprise a client device 110, a database server 120, and a determination server 130.

The client device 110 is configured to provide a first set of parameters for the unit operations.

Figure 3:
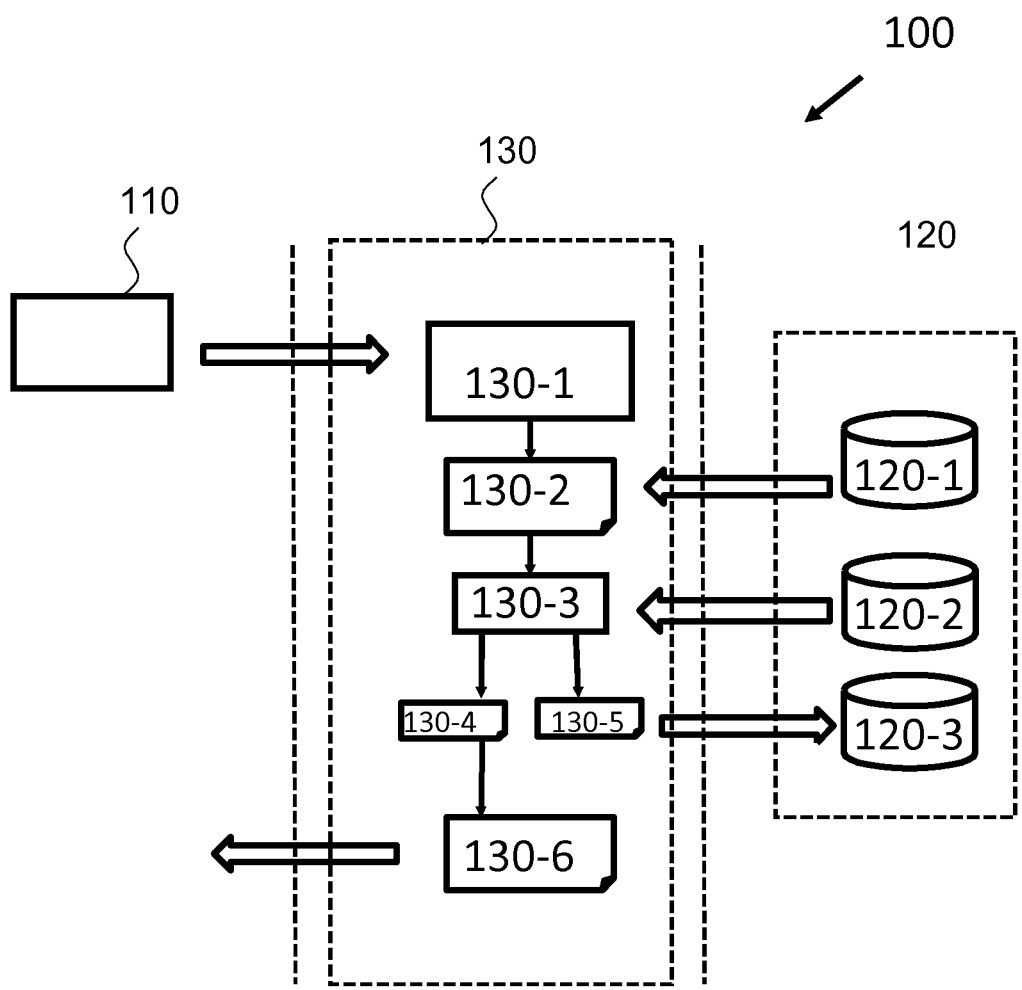
FIG. 3 shows a schematic diagram of a system for determination of unit operations of a chemical plant for acid gas removal according to an exemplary embodiment of the invention.

The database server 120 comprises a database 120-1, 120-2, 120-3 configured to provide data (as illustrated in FIG. 3).

The determination server 130 is configured to provide a second set of parameters for the unit operations based on the provided first set of parameters and based on the data from a database. The determination server 130 is further configured to determining a digital model of the chemical plant based on the first set of parameters and the second set of parameters, wherein the digital model comprises a matrix or a system of equations defining the unit operations of the chemical plant. The determination server 130 is further configured to select starting points for an equation-based solution method of the system of equations, wherein the starting points are selected by using the first set of parameters, the second set of parameters; and the data retrieved from the database.

The determination server 130 is further configured to determine resultant settings for the unit operations of the chemical plant using the equation-based solution method for the system of equations initialized by the selected starting points.

FIG. 3 shows a further schematic diagram of the system 100 for determining of unit operations of a chemical plant for acid gas removal according to an exemplary embodiment of the invention.

The client device 110 may be configured to provide entered input parameters to the determination server 130, for instance in terms of a solvent name and strength.

The determination server 130 may further comprise a subunit in terms of an input data provider 130-1, which is configured to initialize and convert the provided input parameters and to provide the converted input parameters to a simulation engine 130-2, which is configured to initialize a digital model of the chemical plant for running the simulation.

The output of the initialized and run digital model of the chemical plant may be given by data file 130-4, 130-5. The output may be split in output data for the client and output data for the database.

The database server 120 may comprise, for example, a first database 120-1 for physical properties, a second database 120-2 for starting points, and a third database 120-3 for start profiles.

The second database 120-2 for starting points saves data comprising starting points and associated hashtags that allow identifying and finding results of previously performed simulations as starting point for the intended run of the digital model. The hashtag may be generated by the user or by the determination server 130 or by the database server 120, the servers according to a look-up table.

The third database 120-3 for start profiles saves starting profiles, comprising starting points and metadata. The metadata might be descriptive or structural—describing the chemical plant—or statistical—for instance statistics of previously performed simulations—metadata. A metasearch is performed by the database server 120 within the third database 120-3 in order to identify and find results of previously performed simulations as starting point for the intended run of the digital model.

Starting points may be saved in both the second database 120-2 and the third database 120-3, or solely in the second database 120_2.

The database server 120 may transmit physical properties and/or start profiles depending on the initially provided input parameters. The transmitted physical properties and/or start profiles may be used by the simulation engine 130-2 to initialize the digital model of the chemical plant.

Figure 4:
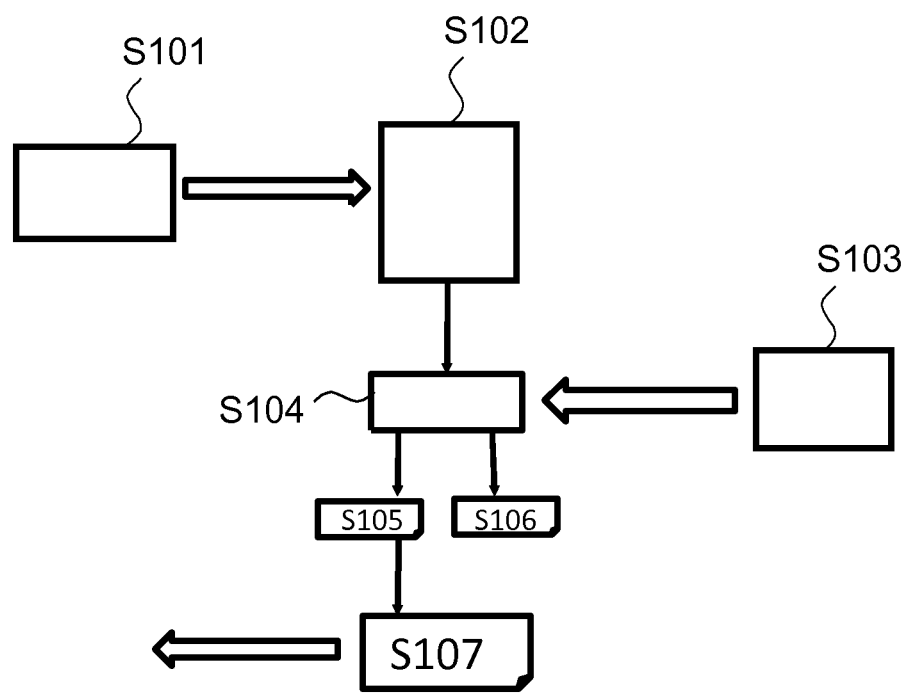

FIG. 4 shows a schematic diagram of a system for determination of unit operations of a chemical plant for acid gas removal according to an exemplary embodiment of the invention.

In step S101, entered input parameters are provided to the determination server 130.

In step S102, the determination server 130 initializes and converts the provided input parameters and to provide the converted input parameters to a simulation engine 130-2.

In step S103, sending starting points and/or starting profiles from databases may be performed.

In step S104, a branching in terms of a different instruction sequence (S105, S106) based on simulated results may be performed.

In step S107, initializing the digital model of the chemical plant by the simulation engine 130-2 may be performed.

Figure 5:
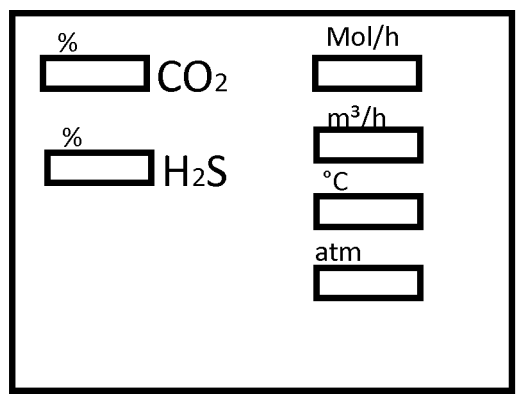
FIG. 5 shows a schematic diagram of a graphical user interface of a method for determination of unit operations of a chemical plant for acid gas removal according to an exemplary embodiment of the invention.

FIG. 5 shows a schematic diagram of a graphical user interface 500 of a method for the determination of unit operations of a chemical plant for acid gas removal according to an exemplary embodiment of the invention.

The user may specify using the graphical user interface the desired operating value within a typical range of the chemical plant of acid gas removal. The absorber unit may for instance be specified by defining parameters of operation like a lean amine temperature within a predefined range of 35° C. to 50° C. or by defining a feed gas pressure within a predefined range of 5 to 100 atm. This data may for instance be provided by the first set of parameters.

The regenerator unit may for instance be specified by defining parameters of operation like for instance temperature range of 110° C. to 150° C. or by defining a pressure range of 1.5 to 7 atm. This data may for instance be provided by the first set of parameters.

Figure 6:
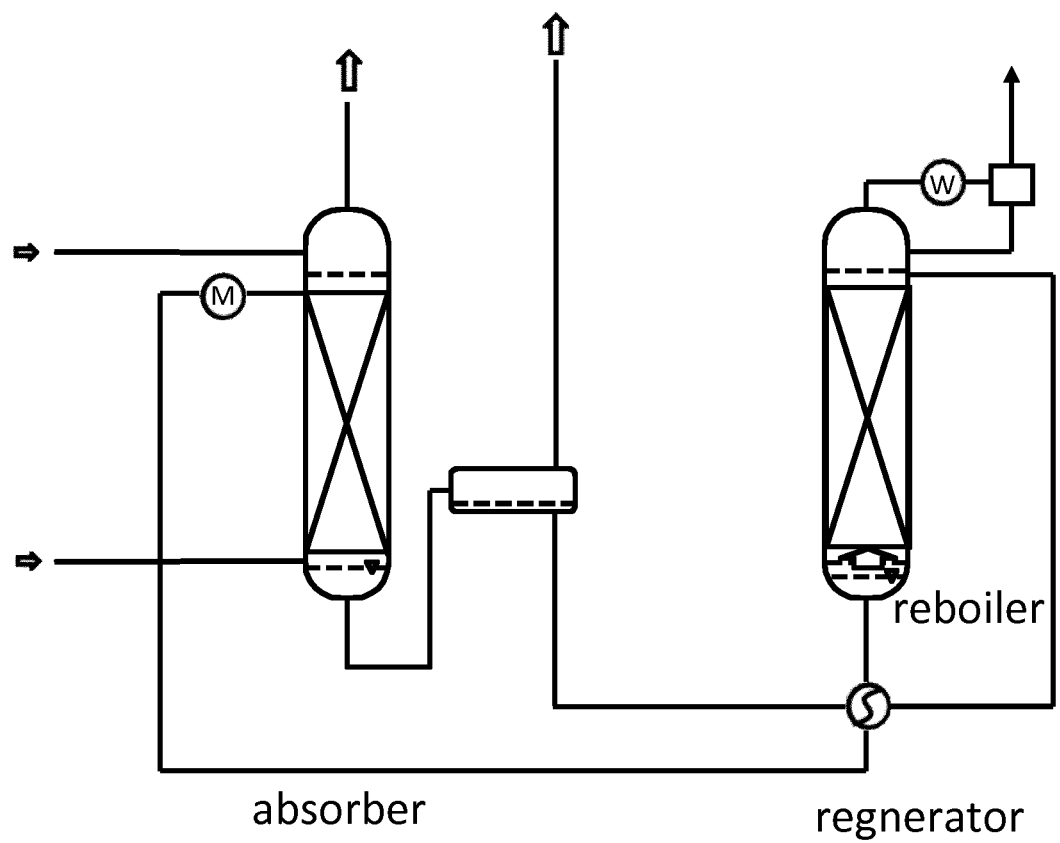
FIG. 6 shows an image of a simulated process flow diagram as used in chemical and process engineering to indicate the general flow of chemical plant processes and equipment according to an exemplary embodiment of the invention.

The user may select an absorption medium and select or specify the desired absorption medium strength FIG. 6 shows an image of a simulated process flow diagram 600 as used in chemical and process engineering to indicate the general flow of chemical plant processes and equipment according to an exemplary embodiment of the invention.

The simulated process flow diagram may for instance be calculated and determined by the determination server and the simulated process flow diagram may be visualized to the user. The simulated process flow diagram may visualize process piping of the chemical plant, units operating certain chemical processes, further equipment items, connections of gas or fluid phase streams or any valves regulating, directing or controlling any flow of a fluid.

FIG. 6 further shows an exemplary chemical plant configuration comprising an absorber unit and a regenerator unit.

The flowsheet is defined by the combination of single unit operations or gas treatment units, like mixer, heater/cooler, flash stage, equilibrium stage column and rate based column. The single unit operations are connected by streams or interconnections. Recycle streams or interconnections may be present which lead to the fact that changes in one unit operation have an impact on some or all unit operations in the flowsheet.

The acid gas removal plant of FIG. 6 includes an absorber and a desorption column as regenerator for the treatment solution. The treatment solution may include an aqueous amine solution as absorption medium. Absorption mediums comprise at least one amine. The following amines are preferred:
(i) amines of formula I:

$$NR^1(R^2)_2 \quad (I)$$

where R1 is selected from C2-C6-hydroxyalkyl groups, C1-C6-alkoxy-C2-C6-alkyl groups, hydroxy-C1-C6-alkoxy-C2-C6-alkyl groups and 1-piperazinyl-C2-C6-alkyl groups and R2 is independently selected from H, C1-C6-alkyl groups and C2-C6-hydroxyalkyl groups;
(ii) amines of formula II:

$$R^3R^4N\text{---}X\text{---}NR^5R^6 \quad (II)$$

where R3, R4, R5 and R6 are independently of one another selected from H, C1-C6-alkyl groups, C2-C6-hydroxyalkyl groups, C1-C6-alkoxy-C2-C6-alkyl groups and C2-C6-aminoalkyl groups and X represents a C2-C6-alkylene group, —X1-NR7-X2- or —X1-O—X2-, where X1 and X2 independently of one another represent C2-C6-alkylene groups and R7 represents H, a C1-C6-alkyl group, C2-C6-hydroxyalkyl group or C2-C6-aminoalkyl group;
(iii) 5- to 7-membered saturated heterocycles which have at least one nitrogen atom in the ring and may comprise one or two further heteroatoms selected from nitrogen and oxygen in the ring, and
(iv) mixtures thereof.
Specific examples are:
(i) 2-aminoethanol (monoethanolamine), 2-(methylamino)ethanol, 2-(ethylamino)ethanol, 2-(n-butylamino)ethanol, 2-amino-2-methylpropanol, N-(2-aminoethyl)piperazine, methyldiethanolamine, ethyldiethanolamine, dimethylaminopropanol, t-butylaminoethoxyethanol, 2-amino-2-methylpropanol;
(ii) 3-methylaminopropylamine, ethylenediamine, diethylenetriamine, triethylenetetramine, 2,2-dimethyl-1,3-diaminopropane, hexamethylenediamine, 1,4-diaminobutane, 3,3-iminobispropylamine, tris(2-aminoethyl)amine, bis(3-dimethylaminopropyl)amine, tetramethylhexamethylenediamine;
(iii) piperazine, 2-methylpiperazine, N-methylpiperazine, 1-hydroxyethylpiperazine, 1,4-bishydroxyethylpiperazine, 4-hydroxyethyl piperidine, homopiperazine, piperidine, 2-hydroxyethylpiperidine and morpholine; and
(iv) mixtures thereof.

In a preferred embodiment the absorption medium comprises at least one of the amines monoethanolamine (MEA), methylaminopropylamine (MAPA), piperazine, diethanolamine (DEA), triethanolamine (TEA), diethylethanolamine (DEEA), diisopropylamine (DIPA), aminoethoxyethanol (AEE), dimethylaminopropanol (DIMAP) and methyldiethanolamine (MDEA) or mixtures thereof.

The amine is preferably a sterically hindered amine or a tertiary amine. A sterically hindered amine is a secondary amine in which the amine nitrogen is bonded to at least one secondary carbon atom and/or at least one tertiary carbon atom; or a primary amine in which the amine nitrogen is bonded to a tertiary carbon atom. One preferred sterically hindered amine is t-butylaminoethoxyethanol. One preferred tertiary amine is methyldiethanolamine.

When the amine is a sterically hindered amine or a tertiary amine the absorption medium preferably further comprises an activator. The activator is generally a sterically unhindered primary or secondary amine. In these sterically unhindered amines the amine nitrogen of at least one amino group is bonded only to primary carbon atoms and hydrogen atoms.

The sterically unhindered primary or secondary amine is, for example, selected from
alkanolamines, such as monoethanolamine (MEA), diethanolamine (DEA), ethylaminoethanol, 1-amino-2-methylpropan-2-ol, 2-amino-1-butanol, 2-(2-aminoethoxy)ethanol and 2-(2-aminoethoxy)ethanamine,
polyamines, such as hexamethylenediamine, 1,4-diaminobutane, 1,3-diaminopropane, 3-(methylamino)propylamine (MAPA), N-(2-hydroxyethyl)ethylenediamine, 3-(dimethylamino)propylamine (DMAPA), 3-(diethylamino)propylamine, N,N'-bis(2-hydroxyethyl)ethylenediamine,
5-, 6- or 7-membered saturated heterocycles which have at least one NH group in the ring and may comprise one or two further heteroatoms selected from nitrogen and oxygen in the ring, such as piperazine, 2-methylpiperazine, N-methylpiperazine, N-ethylpiperazine, N-(2-hydroxyethyl)piperazine, N-(2-aminoethyl)piperazine, homopiperazine, piperidine and morpholine.

Particular preference is given to 5-, 6- or 7-membered saturated heterocycles which have at least one NH group in the ring and may comprise one or two further heteroatoms selected from nitrogen and oxygen in the ring. Very particular preference is given to piperazine.

In one embodiment the absorption medium comprises methyldiethanolamine and piperazine.

The molar ratio of activator to sterically hindered amine or tertiary amine is preferably in the range from 0.05 to 1.0, particularly preferably in the range from 0.05 to 0.7.

The absorption medium generally comprises 10% to 60% by weight of amine.

The absorption medium is preferably aqueous.

The absorption medium may further comprise a physical solvent. Suitable physical solvents are, for example, N-methylpyrrolidone, tetramethylenesulfone, methanol, oligoethylene glycol dialkyl ethers such as oligoethylene glycol methyl isopropyl ether (SEPASOLV MPE), oligoethylene glycol dimethyl ether (SELEXOL). The physical solvent is generally present in the absorption medium in amounts of 1% to 60% by weight, preferably 10% to 50% by weight, in particular 20% to 40% by weight.

In a preferred embodiment the absorption medium comprises less than 10% by weight, for example less than 5% by weight, in particular less than 2% by weight of inorganic basic salts, such as potassium carbonate for example.

The absorption medium may also comprise additives, such as corrosion inhibitors, antioxidants, enzymes etc. In general, the amount of such additives is in the range of about 0.01-3% by weight of the absorption medium.

The loading factor of a gas component i may be defined as follows:

The loading factor of any gas component i may be related to the ratio of an actual gas loading of component i, which is a function of an actual gas component flow rate of component i in liquid solution and an actual total flow rate of liquid solution, to the equilibrium gas loading of any gas component i, which is a function of a absorption medium composition, temperature, pressure and composition of gas phase.

The acceptable hydraulic load indicates an acceptable hydraulic operational regime in the absorber. It may be determined by a distance of the actual hydraulic load to hydraulic flooding conditions. Here, hydraulic flooding conditions refer to operating conditions, where a further increase in gas or liquid flow in the absorber will lead to flooding of the absorber internals, or liquid is completely entrained by the gas flow. The hydraulic load can be specified via the ratio of the actual hydraulic load in the absorber to the hydraulic load at flooding limit. The acceptable hydraulic load may be related to or indicative of a flooding condition in the absorber, e.g. a flooding curve or a column mass transfer height specific pressure drop in the absorber.

The acceptable hydraulic load may be defined as follows:

The hydraulic load may be related to the ratio of an actual hydraulic load, which is a function of an F-Factor and a liquid velocity wL, to an hydraulic load at flooding limit, which is a function of the F-Factor, the liquid velocity wL, a gas density of the gaseous stream in the absorber, a liquid density of the treatment solution, a gas viscosity density of the gaseous stream in the absorber, a liquid viscosity of the treatment solution, a liquid surface tension of the treatment solution and a geometry of the mass transfer or absorber internals. In this context the hydraulic load may be determined for a constant liquid to gas ratio, for constant F-Factor or for constant liquid velocity wL. Here the F-Factor may be defined as $F\text{-Factor}=\text{gas velocity}*(\text{gas density})^{0.5}.$ Additionally or alternatively the hydraulic load in the absorber may be based on the F-Factor or the liquid velocity as relative parameter. In such case the operating and/or dimensioning parameters and specifically the absorber diameter is determined based on the given F-Factor or liquid velocity. Once such determination is performed a further check may be performed by determining, if the resulting absorber diameter allows for an acceptable hydraulic operational regime in the absorber, such that flooding conditions are avoided. If the determined absorber diameter does not allow for an acceptable hydraulic operational regime in the absorber, such that flooding conditions are met, the determination of operating and/or dimensioning parameters will be resumed or a warning will be provided via the output interface. Such warning may further be provided to the input module, where it may be displayed to a user.

The expression hydraulic load may also be alluded to as capacity in %, safety factor, or loading point.

Particularly, in providing the composition in the treated outlet stream, the acceptable hydraulic load or the loading factor of the treatment solution make the specification of the absorber height, absorber diameter or the flow rate redundant. Thus, absorber height, absorber diameter or flow rate are released parameters in the digital model and are as such a result of the method in the form of dimensioning and/or operating parameters. This enables the input parameters to be specified in a single step such that the result is generated without requiring further manual interactions by the designer. A more robust convergence with less iterations and hence more efficiency in the design process and in the use of computing power is a result. Lastly, the use of the method is less error-prone, simpler and leads to a more effective process in determining the chemically and physically meaningful dimensioning and/or operating conditions of the gas treatment plant.

In a further embodiment the absorber input parameters include the loading factor of the treatment solution, which is determined by the ratio of actual loading, preferred actual gas loading, to equilibrium loading, preferred equilibrium gas loading, at the absorber bottom. Alternatively, the absorber input parameters include the loading factor of the treatment solution, which is determined by an extremum, e.g. a maximum or minimum, of the ratio of actual loading, preferred actual gas loading, to equilibrium loading, preferred equilibrium gas loading, along the absorber height. In this embodiment the extremum may be determined via the profile of the loading factor along the absorber height, wherein the extremum signifies a point of the profile where the first derivative is zero and the second derivative is greater or smaller than zero. The profile may be defined such that the extremum is a maximum.

In a further embodiment the loading factor determined by the ratio of actual loading to equilibrium loading of the treatment solution is less than 1, preferably $\leq 0.95$ and particularly preferred $\leq 0.9$. Here the values may be viewed in terms of a modulus. In such embodiments the full absorber height or a part of the absorber height may be taken into account. For example, the part of the absorber height from the bottom of the absorber to a fraction to the top of the absorber height such as a fraction of 0.9 or 0.8 or a fraction of 0.7 to 0.9 to the top may be taken into account. Using the loading factor in such a way avoids unreasonable or physically not meaningful specifications for determining the dimensioning and/or operating parameters, since there is often no or a very minor mass transfer at the top of the absorber and, hence, only the thermodynamically important part of the absorber is taken into account.

In a further embodiment the loading factor of the treatment solution is determined based on at least one gas component to be absorbed from the inlet stream. In a further embodiment, where more than one gas component to be absorbed is present in the inlet stream, the loading factor is determined as combined loading factor including the more than one gas components to be absorbed from the inlet stream. The combined loading factor accounts for interdependencies between the gas components to be absorbed. Such a combined loading factor reflects thermodynamic as well as kinetic properties of the treatment solution in connection with the gas components to be absorbed. Thus, reasonable or physically meaningful results in determining the dimensioning and/or operating parameters can be ensured.

The combined loading factor may be related to the ratio of an actual loading, which depends on actual gas component flow rates for at least two or more gas components in the treatment solution and an actual total flow rate of the treatment solution or the actual total flow rate of the absorption medium, to equilibrium loading, which depends on absorption medium composition, treatment solution temperature, pressure and composition of the gas phase or the gaseous inlet stream, wherein the VLE is determined based on gas and liquid phase at the same absorber height. Here absorption medium is the liquid phase free of any absorbed components from the gas phase and solution is the liquid phase including any absorbed components.

In a further embodiment the absorber input parameters include configuration parameters specifying the absorber configuration. Such configuration parameters may further specify a column type such as packed bed or tray column, a number of segments in the column, pressure conditions like the pressure drop over the column, temperature conditions or a distributor type for the liquid treatment solution.

In a further embodiment process specific input parameters are provided, which are comprised in the request and are used to initialize the digital model. The process specific input parameters may include absorber input parameters, regenerator input parameters as well as the composition of the gaseous inlet stream at the absorber inlet and absorption medium parameters specifying properties of the treatment solution. If apart from the absorber further gas treatment units or process units are present, the process specific input parameters preferably include further parameters specifying each of the gas treatment units. Alternatively, some of the parameters specifying further gas treatment units may be pre-set to simplify and reduce the number of process specific input parameters.

The gas treatment plant may include one or more gas treatment units such as one or more absorber(s), one or more regenerator(s) and/or further gas treatment units. Additionally process units such as heat exchangers, pumps, gas compressors or a gas condensers may be included in the gas treatment plant and reflected in the digital model via respective unit operations.

The gas treatment plant may include one or more of these gas treatment units or process units. Preferably, the process specific input parameters include configuration parameters, which specify the gas treatment and/or process units included in the gas treatment plant and their interconnection representing streams.

Further, the configuration parameters may be fully or partly pre-defined providing a fixed set of possible configurations. Such pre-defined configurations may be stored in a database and can be identified in the process specific input parameters via one or more identifier(s) signifying the respective configuration parameters. Pre-defined configuration parameters guide the user by reducing the problem space and lead to a more robust and stable determination of operating and/or dimensioning parameters. In embodiments where the configurations are not fully pre-defined the method can include a consistency check to ensure sensible configurations are defined by the user.

In a further embodiment the gas treatment unit includes a regenerator preferably with at least one reboiler for regenerating the treatment solution and feeding the regenerated treatment solution back into the absorber, wherein regenerator input parameters are provided including at least one of the following relative parameters:

i. a fraction quality of the regenerated treatment solution or lean solution, a strip steam ratio, or a loading factor indicating the distance to the equilibrium capture capacity of the regenerated treatment solution or lean solution at the absorber top; and ii. an acceptable hydraulic load indicating an acceptable hydraulic operational regime in the regenerator.

The regenerator input parameters may include at least one of the reboiler duty or the regenerator diameter as relative parameters by providing:

i. for the reboiler duty, the fraction quality of the regenerated treatment solution or strip steam ratio or a loading factor of one component at the absorber top; and ii. for the regenerator diameter, an acceptable hydraulic load for the regenerator.

In one example the regenerator input parameters include all available relative parameters. In another example the regenerator input parameters include one of the available relative parameters and the remaining regenerator input parameters are specified via the corresponding parameters.

Here the reboiler duty refers to the heat duty requirement of the regenerator, which has a significant impact on the energy consumption of the gas treatment plant. The regenerator input parameters may not include at least one of the reboiler duty or the regenerator diameter. Instead the fraction quality of the regenerated treatment solution or lean solution, the strip steam ratio, or the loading factor of the regenerated treatment solution or lean solution at the absorber top or the acceptable hydraulic load may be provided.

Here the fraction quality of the regenerated treatment solution or lean solution refers to the concentration of one or more gas components that remain in the lean solution after regeneration. The fraction quality may be viewed as a composition specifying a proportion of one or more remaining gas component(s) in the lean solution. In one embodiment the composition may be derived from analytical sensor data such as data measured through spectral methods or chromatographic methods. Such data may be received by the input unit or the interface unit of the determination server.

The strip steam ratio may be based on a water flow rate in regeneration and an acid gas flow rate in regeneration. The strip steam ration may be defined by the ratio of the water flow rate in regeneration to the acid gas flow rate in regeneration. This may be determined for constant height, e.g. at the top or between bottom and top.

The acceptable hydraulic load indicates an acceptable hydraulic operational regime in the regenerator. It may be determined by a distance of the actual hydraulic load to hydraulic flooding conditions. Here, hydraulic flooding conditions refer to operating conditions, where a further increase in gas or liquid flow in the regenerator will lead to flooding of the regenerator internals, or liquid is completely entrained by the gas flow.

The hydraulic load can be specified via the ratio of the actual hydraulic load in the regenerator in operation to the hydraulic load at flooding limit. The acceptable hydraulic load may be related to or indicative of a flooding condition in the regenerator, e.g. a flooding curve or a column mass transfer height specific pressure drop in the regenerator.

Figure 7:
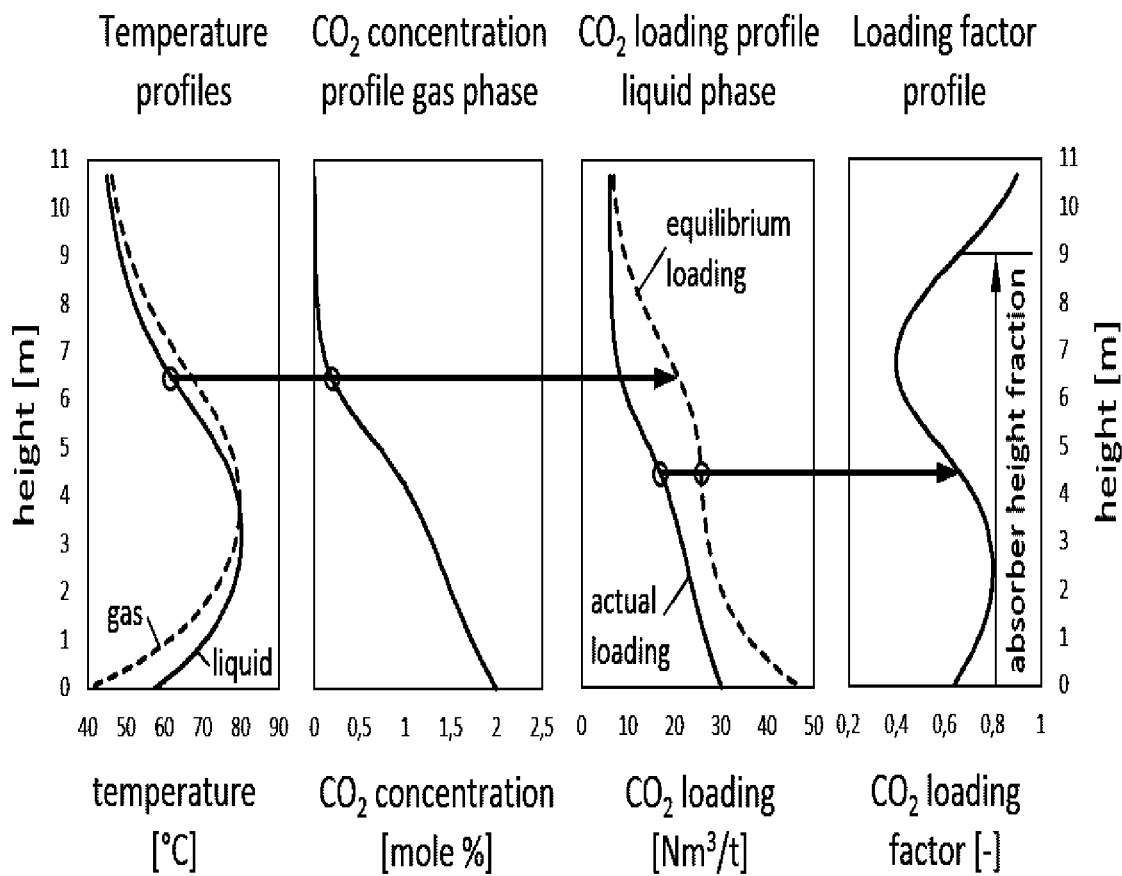
FIG. 7 illustrates an exemplary embodiment for determining the CO2 loading factor via the ratio of the actual loading to the equilibrium loading in the liquid phase.

FIG. 7 illustrates an exemplary embodiment for determining the $CO_2$ loading factor via the ratio of the actual loading to the equilibrium loading in the liquid phase.

One element for allowing the relative parameters is to provide the loading factor at the absorber bottom or the maximum loading factor along the absorber height. Exemplary column profiles to determine the loading factor are shown in FIG. 6.

The first graphical representation of absorber height versus temperature illustrates the temperature profiles in the gas and liquid phase. Providing the loading factor profile is especially important for absorption processes with a pronounced temperature bulge as shown in the first graphical representation.

Such temperature bulge occurs when exothermic heat of reaction and/or heat of absorption is released. The second graphical representation of absorber height versus $CO_2$ concentration illustrates the $CO_2$ concentration profile in the gas phase.

Temperature and $CO_2$ concentration in the gas phase determine the equilibrium loading profile of $CO_2$ in the liquid phase as shown by the dashed line in the third graphical representation of absorber height versus $CO_2$ loading.

The actual loading profile of $CO_2$ in the liquid phase as shown by the solid line is determined for each iteration of the equation-based solution method. The loading factor profile as shown in the fourth graphical representation is defined by the actual loading of $CO_2$ in the liquid phase divided by the equilibrium loading A value of 1 for the loading factor means that the equilibrium value is reached and no mass transfer occurs. This will lead to an infinite absorber height as calculation result for specifying a $CO_2$ concentration in the treated outlet gas. As consequence, for designing gas treatment plants the loading factor needs to be specified to a value<1 to avoid a physically not possible specification. A reasonable loading factor is for instance <0.95 or <0.9.

If $CO_2$ and $H_2S$ both are present in the inlet gas the single loading factors of $CO_2$ or $H_2S$ may be misleading and may not be useful for specification. For such cases, a combined loading factor for $CO_2+H_2S$ is used as specification.

In the exemplary FIG. 6 of the loading factor profile along the absorber it can be observed that the maximum value of the loading factor is reached at the absorber top. This is due to specification of the $CO_2$ content in the treated gas at 90% of the absorber height and the available lean loading at the absorber top. This maximum loading factor at the absorber top is acceptable and does not lead to physically unreasonable conditions.

However, the maximum loading factor around the position of the maximum temperature is critical and needs to be limited to values<1 as mentioned above. To ensure, that the maximum loading factor is specified at the right position, the loading factor is evaluated from absorber bottom to a defined absorber height fraction.

Figure 8:
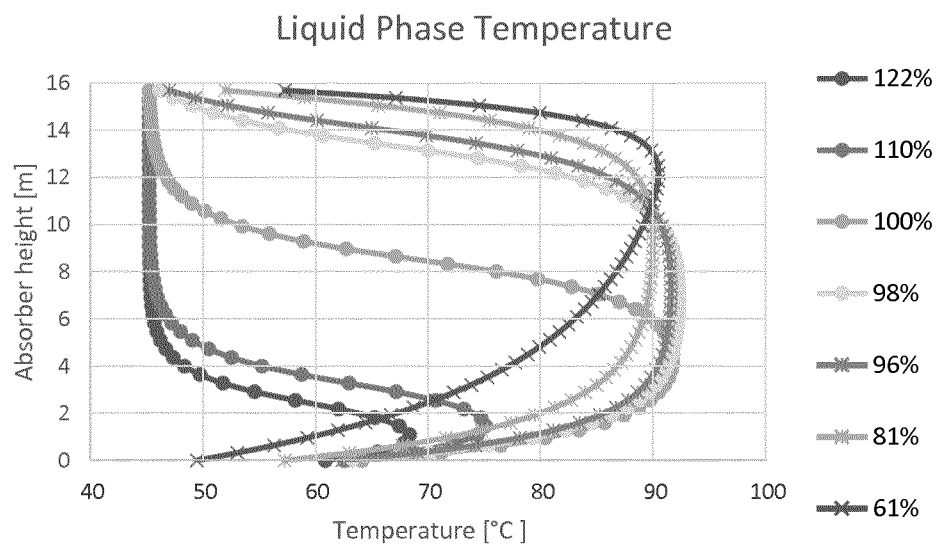
FIG. 8 shows the liquid phase temperature behavior illustrating absorber height versus temperature dependency for different liquid flow rates and constant gas flow rate.
Figure 9:
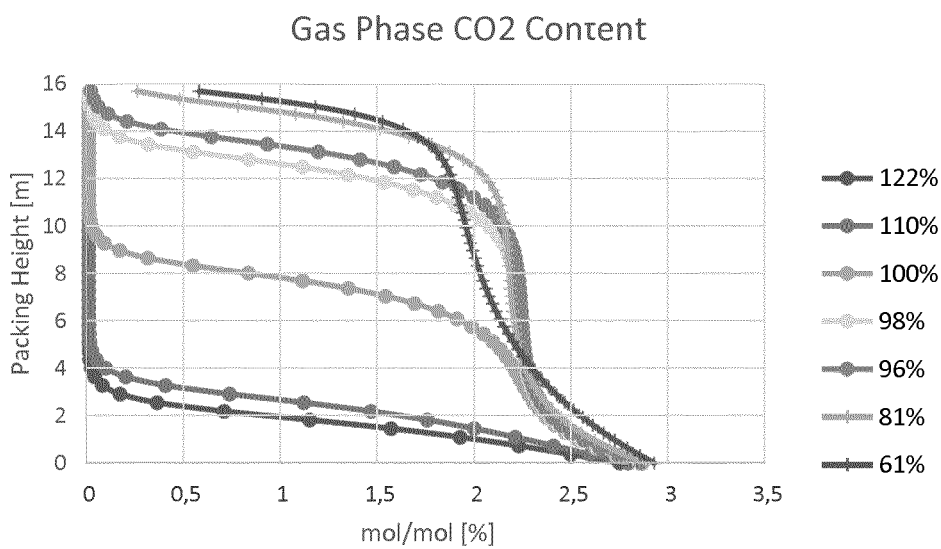
FIG. 9 shows the gas phase CO2 content behavior illustrating absorber height versus CO2 content dependency for different liquid flow rates and constant gas flow rate.
Figure 10:
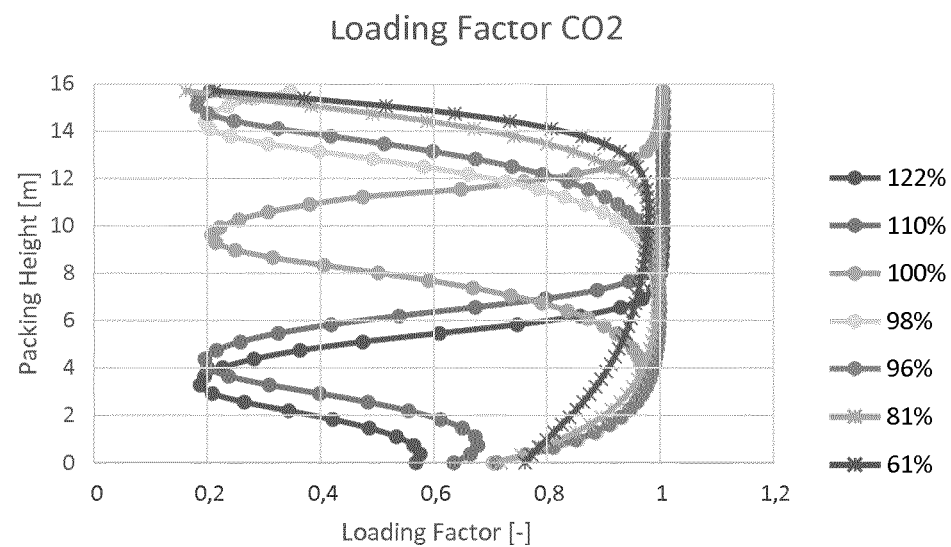
FIG. 10 shows the loading factor CO2 behavior illustrating absorber height versus loading factor dependency for different liquid flow rates and constant gas flow rate.

FIGS. 8 to 10 illustrate the liquid phase temperature behavior, the gas phase CO2 content behavior and the loading factor as determined for different liquid flow rates in %. These illustrations resemble the behavior in the absorber of the gas treatment plant, if the liquid flow rate as parameter dependent on the plant throughput, is varied. Notably, the profiles in FIGS. 8 and 9 show a large effect in the profile shape for flow rates between 110% and 98%. Correspondingly, the concentration profile in FIG. 9. and the loading factor profile in FIG. 10 show that CO2 breakthrough occurs around 98% at the absorber top. Below and above the flow rate of 100% the profile shape does not change significantly. Hence around the flow rate of 100% the profile shapes are the most sensitive.

Figure 11:
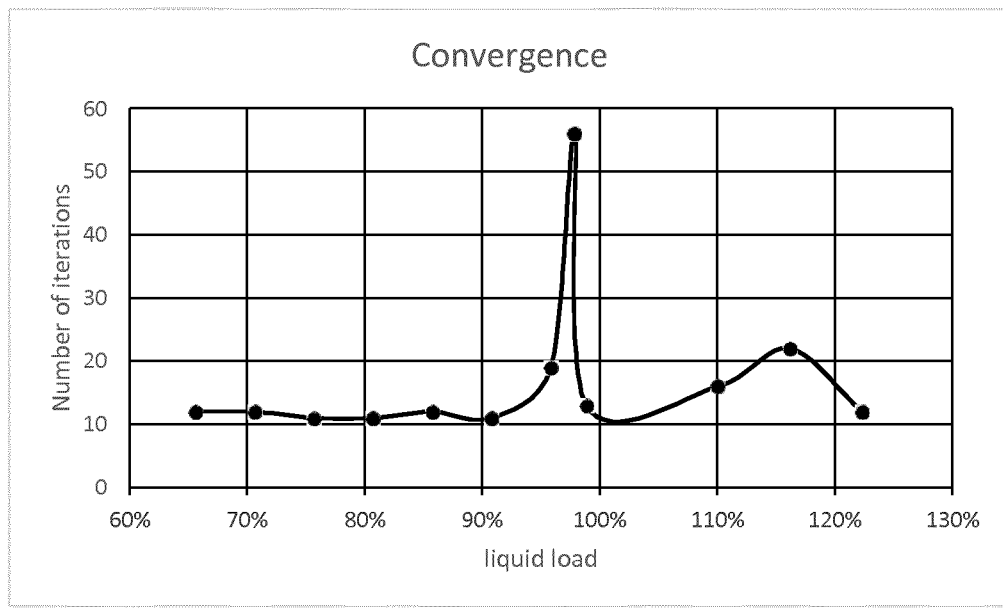
FIG. 11 shows the convergence behavior illustrating the number of iterations versus flow rate.

This behavior of the physical quantities in the absorber—temperature and CO2 content in the gas—is reflected in the number of iterations shown in FIG. 11 when stepwise increasing the flow rate for the given values. In the region between 96 to 98% flow rate the convergence behavior is such that the determination of operating and/or dimensioning parameters takes up to 6 times more iterations than above or below that region.

For the operation of the absorber in the gas treatment plant this signifies an instable operation mode, since the absorber would be operated close to the CO2 gas breakthrough point. Hence, in setting the flow rate to an adequate value signifying a stable absorber operation is crucial to design a correspondingly stable gas treatment plant. In order to ensure that such a stable solution is provided in determining the operating and/or dimensioning parameters, it is highly advantages to allow the loading factor as an input.

Depending on whether the loading factor is determined at the absorber bottom or the maximum is taken along the absorber height, the two regimes where fast convergence is possible can be distinguished. At the same time such an approach ensures that the determination results in operating and/or dimensioning parameters that allow stable operation of the absorber and the gas treatment plant.

The following example illustrates the significant efficiency increase to a user for designing a gas treatment plant and the simplification of the design procedure. Given are the conditions of two different feed gases referred to as Case A and Case B, which only differ in the concentration of carbon dioxide and methane. All other conditions like temperature, pressure flow rate and the concentration of residual components are identical. An overview of all feed gas conditions is given in the following table:

| Feed gas conditions | Unit | Case A | Case B |
|---|---|---|---|
| Flow rate | Nm3/hr | 500000 | 500000 |
| Temperature | ° C. | 30 | 30 |
| Pressure | bar(a) | 60 | 60 |
| Composition in mole fraction | | | |
| Carbon dioxide ($CO_2$) | mole/mole | 0.5 | 10 |
| Methane ($CH_4$) | mole/mole | 93.5 | 84 |
| Ethane ($C_2H_6$) | mole/mole | 3 | 3 |
| Propane ($C_3H_8$) | mole/mole | 2 | 2 |
| Butane ($C_4H_{10}$) | mole/mole | 1 | 1 |
| Water content | — | saturated | saturated |

The task is to design a grassroots $CO_2$ removal plant for a LNG production plant with a $CO_2$ concentration in the treated gas of 50 mole-ppm. The plant configuration should consist of an absorption column, an HP flash and a stripper column. The user needs to define several process parameters like solution flow rate, absorber packing height, absorber diameter, reboiler duty, and stripper diameter.

Applying a state of the art process flow sheet simulator, plant geometry, conditions of inlet streams and process conditions need to be defined prior to running the simulation. The conditions of all outlet streams, like the $CO_2$ concentration in the treated gas, are a result of the calculation of the process simulator.

For achieving a specified acid gas concentration in the treated gas, the user needs to change process conditions mentioned above in a lot of manual iterations until the required $CO_2$ concentration in the treated gas is reached. Reason is that even an experienced user a prior does not know the exact result for the operating and dimensioning parameters.

Furthermore, the user may even define conditions during the manual iterations, which cannot lead to the required $CO_2$ concentration in the treated gas. As example, the required $CO_2$ concentration in the treated gas can only be reached, if the $CO_2$ concentration in the lean solution is below the corresponding $CO_2$ equilibrium concentration at the absorber top. Such conditions need to be identified by the user, which requires additional manual iterations.

In this example, the user needs to define not only but at least the five main process parameters solution flow rate, absorber packing height, absorber diameter, reboiler duty and stripper diameter. The following table shows results for these five process parameters as relative values between the exemplary cases A and B.

| Main process parameters | Case A | Case B |
|---|---|---|
| Solution flow rate | P1 | 16.35 * P1 |
| Absorber packing height | P2 | 0.80 * P2 |
| Absorber diameter | P3 | 1.55 * P3 |
| Reboiler duty | P4 | 19.22 * P4 |
| Stripper diameter | P5 | 4.27 * P5 |

Applying a state of the art process flow sheet simulator, the user requires a lot of manual iterations for the design of a $CO_2$ removal plant for Case A. Although knowing the result of Case A, Case B leads to very different conditions, which are not obvious to the user a priory. Thus, the user again requires a lot of manual iterations for the design of a $CO_2$ removal plant for Case B.

These examples show, that application of a state of the art process simulator leads to a lot of manual and time-consuming iteration steps, which make the design process very tedious and inefficient.

Applying the present invention for the exemplary cases A and B and specifying the five parameters $CO_2$ concentration in the treated gas, maximum loading factor for $CO_2$ in the absorber, safety factor for the absorber, loading factor for $CO_2$ at the absorber top and safety factor for the stripper, the user will receive the results shown in the table above in one step of manual input. This leads to a significant simplification of the design procedure and to a reduced time for the design procedure and thus to increased efficiency.

Any of the components described herein used for implementing the methods described herein may be in a form of a computer system having one or more processing devices capable of executing computer instructions. The computer system may be communicatively coupled (e.g., networked) to other machines in a local area network, an intranet, an extranet, or the Internet. The computer system may operate in the capacity of a server or a client machine in client-server network environment, or as a peer machine in a peer-to-peer (or distributed) network environment. The computer system may be a PC (Personal Computer), a tablet PC, a PDA (Personal Digital Assistant), a cellular telephone, a web appliance, a server, a network router, switch or bridge, or any machine capable of executing a set of instructions (sequential or otherwise) that specify actions to be taken by that machine. Further, it is to be understood that the terms "computer system," "machine," "electronic circuitry," and the like are not necessarily limited to a single component, and shall be taken to include any collection of machines that individually or jointly execute a set (or multiple sets) of instructions to perform any one or more of the methodologies discussed herein.

Some or all of the components of such a computer system may be utilized by or illustrative of any of the components of the system 100, such as the client device 110, the database 120, and the determination server 130. In some embodiments, one or more of these components may be distributed among multiple devices, or may be consolidated into fewer devices than illustrated. The computer system may include, for example, one or more processing devices, a main memory (e.g., ROM, flash memory, DRAM (Dynamic Random Access Memory) such as SDRAM (Synchronous DRAM) or RDRAM (Rambus DRAM), etc.), a static memory (e.g., flash memory, SRAM (Static Random Access Memory), etc.), and/or a data storage device, which communicate with each other via a bus.

A processing device may be a general-purpose processing device such as a microprocessor, microcontroller, central processing unit, or the like. More particularly, the processing device may be a CISC (Complex Instruction Set Computing) microprocessor, RISC (Reduced Instruction Set Computing) microprocessor, VLIW (Very Long Instruction Word) microprocessor, or a processor implementing other instruction sets or processors implementing a combination of instruction sets. The processing device may also be one or more special-purpose processing devices such as an ASIC (Application-Specific Integrated Circuit), an FPGA (Field Programmable Gate Array), a CPLD (Complex Programmable Logic Device), a DSP (Digital Signal Processor), a network processor, or the like. The methods, systems and devices described herein may be implemented as software in a DSP, in a micro-controller, or in any other side-processor or as hardware circuit within an ASIC, CPLD, or FPGA. It is to be understood that the term "processing device" may also refer to one or more processing devices, such as a distributed system of processing devices located across multiple computer systems (e.g., cloud computing), and is not limited to a single device unless otherwise specified.

The computer system may further include a network interface device. The computer system also may include a video display unit (e.g., an LCD (Liquid Crystal Display), a CRT (Cathode Ray Tube) display, or a touch screen), an alphanumeric input device (e.g., a keyboard), a cursor control device (e.g., a mouse), and/or a signal generation device (e.g., a speaker).

A suitable data storage device may include a computer-readable storage medium on which is stored one or more sets of instructions (e.g., software) embodying any one or more of the methodologies or functions described herein. The instructions may also reside, completely or at least partially, within the main memory and/or within the processor during execution thereof by the computer system, main memory, and processing device, which may constitute computer-readable storage media. The instructions may further be transmitted or received over a network via a network interface device.

A computer program for implementing one or more of the embodiments described herein may be stored and/or distributed on a suitable medium, such as an optical storage medium or a solid state medium supplied together with or as part of other hardware, but may also be distributed in other forms, such as via the internet or other wired or wireless telecommunication systems. However, the computer program may also be presented over a network like the World Wide Web and can be downloaded into the working memory of a data processor from such a network.

According to a further exemplary embodiment of the present invention, a data carrier or a data storage medium for making a computer program element available for downloading is provided, which computer program element is arranged to perform a method according to one of the previously described embodiments of the invention.

The terms "computer-readable storage medium," "machine-readable storage medium," and the like should be taken to include a single medium or multiple media (e.g., a centralized or distributed database, and/or associated caches and servers) that store the one or more sets of instructions. The terms "computer-readable storage medium," "machine-readable storage medium," and the like shall also be taken to include any transitory or non-transitory medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Some portions of the detailed description may have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is herein, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "receiving," "retrieving," "transmitting," "computing," "generating," "adding," "subtracting," "multiplying," "dividing," "selecting," "optimizing," "calibrating," "detecting," "storing," "performing," "analyzing," "determining," "enabling," "identifying," "modifying," "transforming," "applying," "extracting," and the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

It has to be noted that embodiments of the invention are described with reference to different subject matters. In particular, some embodiments are described with reference to method type claims whereas other embodiments are described with reference to the device type claims.

However, a person skilled in the art will gather from the above and the following description that, unless otherwise notified, in addition to any combination of features belonging to one type of subject matter also any combination between features relating to different subject matters is considered to be disclosed with this application. However, all features can be combined providing synergetic effects that are more than the simple summation of the features.

While the invention has been illustrated and described in detail in the drawings and foregoing description, such illustration and description are to be considered illustrative or exemplary and not restrictive; the invention is not limited to the disclosed embodiments. Other variations to the disclosed embodiments can be understood and effected by those skilled in the art and practicing the claimed invention, from a study of the drawings, the disclosure, and the appended claims. In some instances, well-known structures and devices are shown in block diagram form, rather than in detail, in order to avoid obscuring the present disclosure.

In the claims, the word "comprising" does not exclude other elements or steps, and the indefinite article "a" or "an" does not exclude a plurality. A single processor or controller or other unit may fulfil the functions of several items recited in the claims. The mere fact that certain measures are recited in mutually different dependent claims does not indicate that a combination of these measures cannot be used to advantage. Any reference signs in the claims should not be construed as limiting the scope.

The invention claimed is:

1. A method of determining unit operations of a chemical plant configured for acid gas removal from a gaseous inlet stream, the method carried out by a computer or a distributed computer system, wherein the method comprises and comprising the steps of:
   i) providing (S1) a first set of parameters for the unit operations;
   ii) providing (S2) a second set of parameters for the unit operations based on the provided first set of parameters and based on data retrieved from a database;
   iii) determining (S3) a digital model of the chemical plant based on the first set of parameters and the second set of parameters, wherein the digital model comprises a system of equations defining the unit operations of the chemical plant;
   iv) selecting (S4) starting points of a previously performed equation-based solution method of the system of equations stored in the database and one starting profile out of multiple previously successfully used starting profiles via a metadata search, wherein selecting the starting profile is determined based on input parameters which are the closest to the metadata associate with the starting points, and wherein the starting points are at least partially selected from:
      i) the first set of parameters;
      ii) the second set of parameters; and
      iii) the data retrieved from the database;
   v) determining (S5) resultant settings for the unit operations of the chemical plant using the equation-based solution method for the system of equations initialized by the selected starting points.

2. The method according to claim 1,
   wherein the method further comprises the step of storing the first set of parameters and at least partially the determined resultant settings for the unit operations of the chemical plant in the database.

3. The method according to claim 1,
   wherein the step of selecting the starting points of the previously performed equation-based solution method of the system of equations as stored in the database comprises comparing the determined and stored resultant settings of the previously performed equation-based solution method with desired resultant settings of the current method for determination, wherein optionally the first set of parameters for the unit operations comprises the desired settings.

4. The method according to claim 1, wherein the first set of parameters for the unit operations is provided by a client device; and/or wherein the second set of parameters for the unit operations is provided by a determination server; and/or wherein the data is provided by a database server.

5. The method according to claim 1,
wherein the first set of parameters for the unit operations comprises at least one relative parameter; and/or
wherein the second set of parameters for the unit operations comprises at least one relative parameter; and/or
wherein the data comprises at least one relative parameter.

6. The method according to claim 1,
wherein the step of providing (S2) the second set of parameters for the unit operations based on the first set of parameters comprises:
i) providing at least one parameter, which was not specified by the first set of parameters; and/or
ii) providing at least one parameter, which Is a complementary parameter to parameter the first set of parameters.

7. The method according to claim 1,
wherein the providing of the second set of parameters for the unit operations based on the first set of parameters comprises determining unspecified or complementary parameters with regard to the first set of parameters using chemical parameters and/or physical parameters and/or physical properties equilibrium data kinetic data physical data geometric data or geometry parameter model parameter as specified by the data retrieved from the database.

8. A system for determining unit operations of a chemical plant configured for acid gas removal from a gaseous inlet stream, the system comprising: a
determination server communicatively coupled to a client device and a database server comprising a database, wherein the determination server is configured to:
provide a first set of parameters for the unit operations;
provide a second set of parameters for the unit operations based on the first set of parameters and based on data retrieved from the database server;
determine a digital model of the chemical plant based on the first set of parameters and the second set of parameters, wherein the digital model comprises a system of equations defining the unit operations of the chemical plant;
select starting points of a previously performed equation-based solution method of the system of equations stored in the database and one starting profile out of multiple previously successfully used starting profiles via metadata search, wherein selecting the starting profile is determined based on input parameters which are closet to the metadata associated with the starting points, and wherein the starting points are at least partially selected from:
i) the first set of parameters;
ii) the second set of parameters; and
iii) the data retrieved from the database; and
determine resultant settings for the unit operations of the chemical plant using the equation-based solution method for the system of equations initialized by the selected starting points.

9. The system according to claim 8,
wherein the system is further configured to store the selected starting points and the determined resultant settings for the unit operations of the chemical plant in the database of the database server.

10. The system according to claim 8,
wherein the determination server is further configured to select the starting points of the previously performed equation-based solution method of the system of equations as stored in the database by comparing the determined and stored resultant settings of the previously performed equation-based solution method with desired settings of the current method for determination, wherein optionally the first set of parameters for the unit operations comprise the desired settings.

11. The system according to claim 8,
wherein the determination server is further configured to provide the second set of parameters for the unit operations based on the first set of parameters by:
i) providing at least one parameter, which was not specified by the first set of parameters; and/or
ii) providing at least one parameter, which is a complementary parameter to the first set of parameters.

12. The system according to claim 8,
wherein the determination server is further configured to provide the second set of parameters for the unit operations based on the first set of parameters by determining unspecified or complementary parameters with regard to the first set of parameters using chemical parameters as specified by the data.

13. The system according to claim 8,
wherein the first set of parameters for the unit operations comprises at least one relative parameter; and/or
wherein the second set of parameters for the unit operations comprises at least one relative parameter; and/or
wherein the data comprises at least one relative parameter.

* * * * *